PHOTOPOLYMERIZABLE ELEMENTS, THEIR PREPARATION AND USE

Filed March 25, 1960

INVENTOR
HARRY EDWARD CRAWFORD

BY Lynn Barratt Morris
ATTORNEY

United States Patent Office 2,993,789

Patented July 25, 1961

2,993,789

PHOTOPOLYMERIZABLE ELEMENTS, THEIR PREPARATION AND USE

Harry Edward Crawford, Paoli, Pa., assignor to E. I. du Pont de Nemours and Company, Wilmington, Del., a corporation of Delaware Filed Mar. 25, 1960, Ser. No. 17,707
10 Claims. (Cl. 96—35)

This invention relates to photopolymerizable elements and more particularly to such elements which are suitable for the preparation of letterpress printing reliefs. Still more particularly it relates to photopolymerizable elements which are useful for the preparation of line and halftone printing reliefs simultaneously by a photopolymerization process. The invention also relates to photopolymerization processes and to printing reliefs obtainable from such photopolymerizable elements and by such processes.

Photopolymerizable elements useful for the preparation of printing reliefs are disclosed in Plambeck U.S. Patent No. 2,760,863, granted August 28, 1956, and certain of these elements are claimed in Plambeck U.S. Patent 2,791,504, granted May 7, 1957. In these patents it is disclosed that inhibitors of thermal addition polymerization may be present. These inhibitors, e.g., hydroquinone and tertiary butyl catechol, are uniformly distributed through the layer and tend to reduce unwanted addition polymerization in non-exposed or non-image areas. The printing characters formed in accordance with the teachings of the Plambeck patents have sloping sides when seen in cross section, the angle formed with the base being a minimum of about 50°. These character shapes are advantageous, but in the case of halftones the well between dots sometimes is very shallow as a result of the interference of the sloping sides of contiguous dots with one another. Consequently, during printing with reliefs of this type the wells tend to plug up with ink. Particularly in the more shaded areas of the halftones where the wells are smaller in diameter and more likely to be shallow and easily plugged is this difficulty noticeable. Furthermore, although the problem exists in printing on all kinds of paper such as that used for greeting cards and for magazines having smooth-surfaced sheets, it is particularly troublesome in printing on softer papers, such as newsprint, where plugging is more apt to occur. According to the above-cited Plambeck patents, the degree of taper of the printing character is obtained by optical means, i.e., by careful choice of the light source and distance from plate to source and by the use of suitable baffles. However, such exact control is difficult to achieve and has required close attention by the technician.

An object of this invention is to provide new and improved photopolymerizable elements. Another object is to provide such elements which result in sharp, clean reliefs in finely detailed areas, halftones and fine rulings. A further object is to provide such elements which are useful in making line and halftone reliefs simultaneously from a process negative containing line and halftone images, especially where the line relief height is greater than 20 mils. Yet another object is to provide a photopolymerizable element whereby the shape of the base of the relief can be controlled automatically. A further object is to provide such elements which can be readily processed by the ordinary technician. A still further object is to provide such elements which can be given a normal exposure in the halftone areas without overexposing larger characters etc., in other areas of a process transparency or stencil. A still further object is to provide a process for making printing reliefs using a photopolymerizable layer more than 20 mils thick which gives halftone reliefs in combination with comparatively large line reliefs both of which are clear and sharp. Still other objects will be apparent from the following description of the invention.

The above objects are attained in accordance with the invention which in one broad aspect comprises a sheet support and a solid photosensitive layer 5 to 250 mils or more in thickness comprising (1) at least one addition-polymerizable non-gaseous ethylenically unsaturated compound capable of forming a high polymer by photoinitiated polymerization in the presence of an addition-polymerization initiator activatable by actinic radiation, (2) at least one preformed compatible solid macromolecular polymer and (3) 0.001% to 35% by weight of such initiator based on the weight of the unsaturated compound, the upper solid stratum of the layer (*a*) constituting at least 2.5 mils but not more than one-half of the thickness of the layer and (*b*) containing at least 1.5 times the amount of inhibitor that is in the lower stratum, there being from 30 to 150,000 parts of said inhibitor per million parts by weight of said unsaturated compound. In general, there are about 10 to 60 parts by weight of constituent (1) and 40 to 90 parts by weight of constituent (2) present in the solid or gel layer. The lower portion of said upper stratum may have a plurality of stratified zones wherein the concentration of inhibitor decreases in accordance with increases in depth of the upper stratum.

In another important aspect of the invention in the novel photopolymerizable elements there is also present a differential gradient in the amount of the initiator which is the reverse of that of the inhibitor of thermal addition-polymerization. To be more specific, the lower stratum of the photosensitive layer constitutes not more than half of the thickness of the entire layer of addition polymerizable material on the support and has a concentration of initiator greater than enough to effect uniform polymerization of the layer and normally at least 1.5 times that present in the upper stratum of 2.5 to 125 mils containing the greater concentration of inhibitor. The lower part of the layer may have a plurality of strata wherein the concentration of initiator increases in accordance with increases in the depth of the layer. In these strata, as described above, the concentration of inhibitor decreases in accordance with increases in the depth of the layer.

The photopolymerizable elements of the invention containing an inhibitor differential can be prepared in various manners. A practical method comprises admixing a photopolymerizable composition containing an ethylenically unsaturated compound or compounds together with a compatible macromolecular polymer, and the initiator and other desired adjuvants with a relatively small amount of a thermal addition polymerization inhibitor, admixing a suitable solvent, if desired, and casting or extruding the composition to form a film. Thus, a film of the desired thickness may be cast from a solvent solution or liquefied composition containing a normal amount of inhibitor onto a smooth casting surface, e.g., a glass plate or a polished metal plate, drum or belt. The photopolymerizable film is stripped from the smooth surface and brought or pressed into surface contact with a similar film made from a similar solution containing a greater amount of inhibitor. If the films are still wet or have a tacky or adhesive surface, the adherence or bonding between the two layers is generally sufficient. If necessary, a firm bond can be attained by heating and pressing. Three or more films can be made in like manner and a laminate formed. When the uppermost layer is to contain more inhibitor and less initiator than the lower layer or layers, the compositions will be adjusted appropriately. The resulting laminate or composite photopolymerizable sheet is then pressed with the layer containing the lesser amount of inhibitor being lowermost into contact with the surface of a suitable support. This surface can be an adhesive or anchor layer (which may contain an antihalation material) on a permanent support. By means of pressure and heating if necessary there will result a firm bonding between the support and all appertaining layers.

By having a larger amount of inhibitor in the upper strata of the photopolymerizable element, the upper portions of the printing characters produced therefrom have nearly straight sides in cross-section at a duration of exposure which at the same time permits the bases of the characters to be broad. Thus a relief of great strength is obtained in which the printing characters, having broad bases, are firmly anchored to the support. The upper portions, having nearly straight sides, provide very sharp printing edges and avoid the formation of shallow wells between the characters. Furthermore, because the edges of the upper portions are essentially straight, there is practically no broadening of the characters of the printed impression as the plate wears down with use. In stratified plates in which the upper stratum contains an increased amount of inhibitor and the lower stratum contains increased amounts of initiator, an especially advantageous character shape is obtained. The cross-section shows an upper portion where the angle at which the side approaches the support is about 90° and a base which is not only broader than the top but is also buttressed between the support and the point of juncture between the upper and lower strata.

Suitable thermal polymerization inhibitors which can be used include hydroquinone and alkyl and aryl-substituted hydroquinones, hydroquinone monomethyl ether, tert-butyl catechol, pyrogallol, copper resinate, naphthylamines, $\beta$-naphthol, p-benzoquinone, $Cu_2Cl_2$, 2,6-di-tert-butyl-p-cresol, dicyclopentadienyliron, phenothiazine, pyridine, nitrobenzene, and dinitrobenzene. Other useful inhibitors include p-toluquinone and chloranil, and thiazine dyes, e.g., thionine, thionine blue G, methylene blue B and toluidine blue O.

The photopolymerizable composition used for the photopolymerizable layer or strata can contain about 10% to about 60% by weight of the layer of the non-gaseous addition-polymerizable ethylenically unsaturated compound having 1 to 4 terminal ethylenic groups and being capable of forming a high polymer by photoinitiated polymerization in the presence of an addition polymerization initiator therefor activatable by actinic radiation and any addition-polymerization initiator activatible by actinic radiation and inactive thermally below 85° C., both either singly or in admixture with one or more other similar compounds and initiators. The photopolymerizable composition also contains, in amounts from about 40% to about 90% by weight of the desired solid photopolymerizable layer, of an added, preformed compatible macromolecular polymer solid at normal temperature and pressure, e.g., a condensation or addition polymer; cellulose ether or ester, etc., as well as immiscible polymeric or non-polymeric organic or inorganic solid filler materials that are essentially transparent in the layer to the actinic radiation, e.g., the organophilic silicas, bentonites, silica, powdered glass, etc., having a particle size less than 0.4 mil in amounts varying with the desired properties of the desired solid photopolymerizable layer. The ethylenically unsaturated compound should have a boiling point above 100° C. at normal pressure and a molecular weight less than 1500.

The preferred addition-polymerizable compounds are ethylenically unsaturated compounds, particularly those wherein the said ethylenic linkages are terminal, i.e., those compounds having the characteristic $CH_2{=}C{<}$ group, i.e., vinylidene compounds. Because of the greater speed with which such compositions polymerize to rigid materials or insoluble polymers, it is preferred that the photopolymerizable layer contain appreciable proportions of ethylenically unsaturated polymerizable compounds containing a plurality of said polymerizable linkages per molecule.

Suitable base or support materials include metals, e.g., steel and aluminum plates, sheets and foils, and films or plates composed of various film-forming synthetic resins or high polymers, such as the addition polymers, including those mentioned later, e.g., vinylidene chloride copolymers with vinyl chloride, vinyl acetate, styrene, isobutylene and acrylonitrile; vinyl chloride homopolymers and copolymers with vinyl acetate, styrene, isobutylene, and acrylonitrile; linear condensation polymers such as polyesters, e.g., polyethylene terephthalate; polyamides, e.g., polyhexamethylenesebacamide; and polyester amides, e.g., polyhexamethyleneadipamide adipate. Fillers or reinforcing agents can be present in the synthetic resin or polymer bases such as the various fibers (synthetic, modified or natural), e.g., cellulosic fibers, for instance, cotton, cellulose acetate, viscose rayon, paper; glass wool; nylon, and polyethylene terephthalate. These reinforced bases may be used in laminated form. The adherent support for the photopolymerizable layer can be a supporting sheet or layer of the photopolymerizable composition.

When a broad light source is used to carry out the exposure step, oblique rays passing through clear areas in the image-bearing transparency will strike the surface of the base at an angle other than 90° and after reflection will cause polymerization in non-image areas. The degree of unsharpness in the relief progressively increases as the thickness of the desired relief and the duration of the exposure increases. It has been found that this disadvantage can be overcome when the photopolymerizable layer is on a light-reflective base by having an intervening stratum sufficiently absorptive of actinic light so that less than 35% of the incident light is reflected. This light-absorptive stratum must be adherent to both the photopolymerized image and the base material. The light-absorptive layer can be formed directly on the surface of the light reflective base, for instance, by dyeing in the case of anodized aluminum plates, by "blueing" or chemical blackening such as is obtained with molten dichromate baths in the case of iron or steel plates. In these instances a separate resin anchor layer adherent to the colored base and the photopolymerizable layer is usually applied. A practical method of supplying the layer absorptive of reflected light, or non-halation layer, is to disperse a finely divided dye or pigment which substantially absorbs actinic light in a solution or aqueous dispersion of a resin or polymer which is adherent to both the support and the photopolymerized image and coating it on the support to form an anchor layer which is dried. Where transparent base materials are used, the antihalation absorbing material may be dispersed in or coated on the reverse side of the support. Antihalation material can be present in the photopolymerizable layer or strata and in such case the polymerizable layer itself can serve as the light-absorptive layer.

In the attached drawing which constitutes a part of this application:

Figure 5:
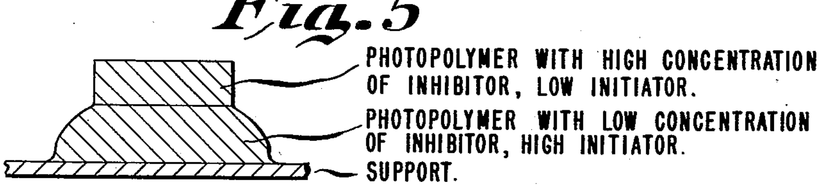
Figure 6:
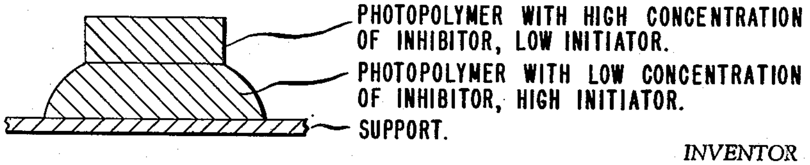

FIG. 5 is an enlarged cross-sectional view of a character made from a laminate of sample sheets A and B of Example 2 wherein a larger concentration of inhibitor and smaller concentration of initiator is in sheet A, and FIG. 6 is an enlarged cross-sectional view of a character made from the laminate of Example 3 having a larger concentration of inhibitor and a lesser amount of initiator in the upper lamina than in the lower lamina.

The invention will be further illustrated by but is not intended to be limited to the following examples wherein the parts and percentages are by weight, unless otherwise indicated.

*Example 1*

The following compositions were prepared:

| Composition | A | B |
|---|---|---|
| Cellulose acetate hydrogen succinate, parts by weight | 2 | 2 |
| Triethylene glycol diacrylate, parts by weight | 1 | 1 |
| Anthraquinone, percent by weight based on triethylene glycol diacrylate | 0.1 | 0.1 |
| Mucochloric acid, percent by weight based on triethylene glycol diacrylate | 0.1 | 0.1 |
| Hydroquinone methyl ether, p.p.m., based on triethylene glycol diacrylate | 1,000 | 3,000 |

Figure 1:
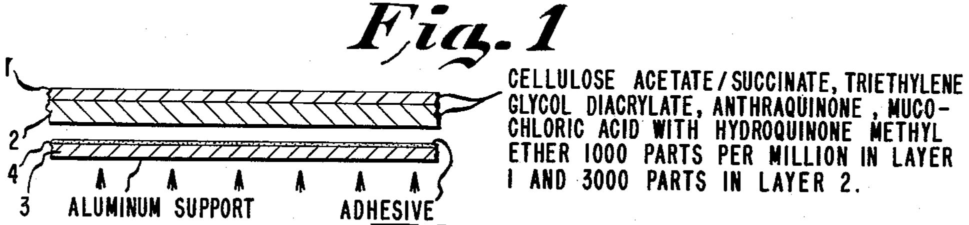
FIG. 1 shows in cross-section the photopolymerizable element described in Example 1.

After the compositions had been mixed and milled at 105° C. for 10 minutes, each composition was pressed to a thickness of 20 mils. As shown in FIG. 1 of the drawing a laminate was made by pressing layer 1 of composition B on layer 2 of composition A and affixing the bottom of the layer of composition A to a thin aluminum support 3 by means of a layer 4 of a copolyester adhesive such as is disclosed in Williams U.S. Patent 2,765,251. The laminated plate was exposed for four minutes through a negative containing a ⅛ inch period as the type character to actinic light from a 2000-watt mercury arc. The unpolymerized material was removed by washing with 0.025 M NaOH. The type character formed had the cross-sectional shape shown in FIG. 2. A printing plate prepared in accordance with this example, whereon the characters had the cross-sectional shape shown in FIG. 2, was used for printing by means of a flat-bed press and gave highly satisfactory printed impressions. Plates made from composition A throughout, i.e., with a uniform distribution of inhibitor at all depths of the photopolymerizable composition, and exposed and developed like the laminated plates of this example produce type characters having straight sides from top to base, the sides meeting the base at an angle of approximately 75°.

*Example 2*

Solutions of the following materials in acetone were prepared.

| | A | B |
|---|---|---|
| Cellulose acetate, parts by weight | 65 | 65 |
| Triethylene glycol diacrylate (TDA), parts by weight | 35 | 35 |
| 2,6-Di-tert-butyl p-cresol, percent by weight based on TDA | 0.5 | 0.1 |
| Benzoin, percent by weight based on TDA | 1 | 5 |

Figure 4:
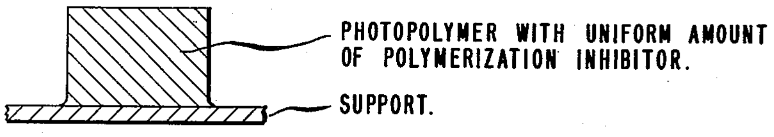
FIG. 4 is an enlarged cross-sectional view of a character made from sample sheet A of Example 2.

Samples of each were cast on glass plates and dried to a thickness of about 40 mils. The dried sheets were stripped from the glass. A sample of A was bonded to an aluminum support by means of "Scotch-Weld" adhesive made by the Minnesota Mining and Manufacturing Co. (a butadiene/acrylonitrile copolymer combined with a phenol/formaldehyde resin; this combination is an adhesive that is largely thermoplastic but that has a small amount of thermosetting effect also). The adhesive also serves as an antihalation layer. A sample of A was laminated to a sample of B by means of heat and pressure. The laminate was bonded by means of "Scotch-Weld" adhesive to an aluminum support, the B portion being contiguous to the aluminum plate. The two plates thus prepared were exposed for 5 minutes through a negative having text characters to the radiation of a 2000-watt high-pressure mercury arc at a distance of 8 inches. The exposed plates were washed with acetone for approximately 5 minutes. The characters formed in the plate prepared from the sheet A had the cross-sectional shape shown in FIGURE 4 (straight sides from top to base, meeting the base at an angle of 90°), whereas those formed from the laminate of sheet A over sheet B had the form shown in FIGURE 5.

*Example 3*

The following solutions were prepared:

| | (1) | (2) |
|---|---|---|
| | *Grams* | *Grams* |
| Polyvinyl butyral | 150 | 150 |
| Ethanol | 460 | 460 |
| Acetone | 460 | 460 |
| Triethylene glycol dimethacrylate | 100 | 100 |
| Benzoin | 5 | 1 |
| Hydroquinone | 0 | 0.2 |
| | (3) | (4) |
| Cellulose nitrate | 150 | 150 |
| Acetone | 950 | 950 |
| Ethylene glycol diacrylate | 100 | 100 |
| Benzoin | 5 | 1 |
| Hydroquinone | 0.05 | 0.2 |
| | (5) | (6) |
| Cellulose acetate | 150 | 150 |
| Acetone | 450 | 450 |
| Triethylene glycol diacrylate | 100 | 100 |
| Phenacryl chloride | 5 | 1 |
| Hydroquinone | 0.05 | 0.2 |
| | (7) | (8) |
| Cellulose acetate | 60 | 60 |
| Acetone | 180 | 180 |
| Triethylene glycol diacrylate | 40 | 40 |
| α,α,p-Tribromoacetophenone | 2 | 0.4 |
| Hydroquinone | 0.02 | 0.08 |

The solutions were cast on glass plates and dried to a thickness of approximately 20 mils. The dried sheets were stripped from the glass. Laminates were made as follows, and the laminates were bonded to aluminum plates by means of the "Scotch-Weld" adhesive described in Example 2:

No. 2 over No. 1
No. 4 over No. 3
No. 6 over No. 5
No. 8 over No. 7

The resulting plates were exposed for 5 minutes through a negative having text characters to the radiation of a 2000-watt high-pressure mercury arc lamp at a distance of 8 inches. In all cases the characters formed had the cross-sectional shape shown in FIGURE 6.

*Example 4*

Two photopolymerizable compositions were made by mixing and milling for 10 minutes at 105° C. the following:

| Composition | A | B |
|---|---|---|
| Cellulose acetate hydrogen succinate | 2 | 2 |
| Triethylene glycol diacrylate | 1 | 1 |
| Anthraquinone, percent by weight based on triethylene glycol diacrylate | 0.001 | 0.001 |
| Hydroquinone methyl ether, p.p.m., based on triethylene glycol diacrylate | 1,000 | 3,000 |

Figure 2:
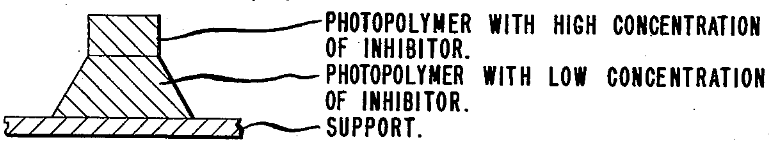
FIG. 2 is an enlarged cross-section of a printing character made from the element of FIG. 1.

Each composition was pressed into a sheet 20 mils thick. The sheet prepared from composition A was placed on a 12-mil thick steel support which had been overcoated with a copolyester adhesive layer about 10 mils thick (3 mils when dry) composed of 37% solids in methyl ethyl ketone, the solids consisting of 100 g. of a copolyester reaction product of an excess of ethylene glycol and dimethyl hexahydroterephthalate, dimethyl sebacate and dimethyl terephthalate in a molar ratio of the latter three reactants of 8:1:1 respectively, 30 g. of triethylene glycol diacrylate, 0.03 g. p-methoxyphenol, and 3 g. of benzoyl peroxide. The sheet prepared from composition B was placed on sheet A and the assembly was placed in a hydraulic press, the platens of which had been preheated to 150° C. and pressed for 3 minutes at 200 p.s.i. A line process photographic negative containing 8-point Corona type as text was placed over the photopolymerizable layer, and the system was placed in a vacuum frame. The photopolymerizable layer was exposed for 10 minutes to the radiation of a 6,000-watt high-intensity carbon arc placed 30 inches above the element. The element was removed from the vacuum frame, spray-washed for 8 minutes with an 0.04 N aqueous solution of NaOH, washed with water and dried. The images formed had cross sections as shown in FIG. 2. The printing element was mounted on a flat-bed press and highly satisfactory printed impressions were obtained.

Letterpress printing plates can be made from the above compositions as disclosed in Patent 2,760,863, granted August 28, 1956, by exposing to actinic light through a process transparency, e.g., a process negative or positive (an image-bearing transparency consisting solely of substantially opaque and substantially transparent areas where the opaque areas are substantially of the same optical density, the so-called line or half-tone negative or positive), a photopolymerizable layer or stratum comprising a polymerizable ethylenically unsaturated component (e.g., a compound or mixture of compounds) capable of forming a high polymer by photoinitiated polymerization in the presence of an addition-polymerization initiator therefor activatable by actinic light, said layer having intimately dispersed therethrough polymerization-effective quantities of such an initiator and the differential quantities of polymerization inhibitor, said layer or stratum being superposed on a suitable adherent support, i.e., adherent to the photopolymerized composition, until addition polymerization to the insoluble state of the composition occurs in the exposed areas but substantially no such polymerization occurs in the non-exposed areas, and essentially completely removing from the original layer the unexposed portions thereof, i.e., the unpolymerized composition, in said non-exposed areas. The photopolymerizable layer need not be composed of monomers only but can also contain substantial amounts of polymer, including incompletely polymerized compounds. In either event, there is substantially no further polymer formation in the unexposed areas during exposure.

A wide variety of addition-polymerizable compounds and compatible polymers may be compounded to form suitable photopolymerizable mixtures for making relief-image printing plates. Preferred compositions, however, are prepared by admixing such polymers as vinyl chloride copolymers; cellulose esters, e.g., cellulose acetate, cellulose acetate hydrogen succinate, cellulose nitrate; polyvinyl alcohol derivatives, e.g., polyvinyl butyral; soluble polyamides, e.g., N-methoxymethyl polyamide; and vinylidene copolymers, e.g., vinylidene chloride/acrylonitrile copolymers; with monomers, e.g., mono-, di-, and triethylene glycol diacrylate, mono-, di-, and triethylene glycol dimethacrylate, pentaerythritol acrylates and methacrylates, glycerol triacrylate, 1,2,4-butanetriol trimethacrylate, pentaerythritol tetralethacrylate, and various polymethacrylamides.

Practically any initiator of addition polymerization which is capable of initiating polymerization under the influence of actinic radiation can be used in the photopolymerizable composition of this invention. Because transparencies transmit heat substantially equally well in the opaque and transparent areas and because conventional light sources give off both heat and light, the preferred initiators are inactive thermally below 85° C. Suitable photopolymerization initiators include vicinal ketaldonyl compounds, e.g., diacetyl, benzil, etc.; α-ketaldonyl alcohols, e.g., benzoin, pivaloin, etc.; acyloin ethers, e.g., benzoin methyl or ethyl ethers; anthraquinone and alkyl-substituted anthraquinones as described in assignee's Notley U.S. application Ser. No. 659,772, filed May 17, 1957, U.S. Patent No. 2,951,758, September 6, 1960; azonitriles, e.g., 1,1'-azadicyclohexane carbonitrile; α-hydrocarbon-substituted aromatic acyloins including α-methylbenzoin, α-allylbenzoin, etc. (U.S. Patent 2,722,512); O-alkyl xanthate esters of the type described in U.S. Patent 2,716,633.

The initiator concentration in the photopolymerizable elements can vary from 0.001% by weight based on the weight of the ethylenically unsaturated compound to the solubility limit of the particular initiator. The maximum concentration of initiator in the elements should not exceed 35% by weight of the monomeric component. The optimum amount of initiator to be used will, of course, vary with the particular initiator and photopolymerizable layer. In general, the amounts of initiator will vary from 0.0003% to 12% by weight of the layer.

Figure 3:
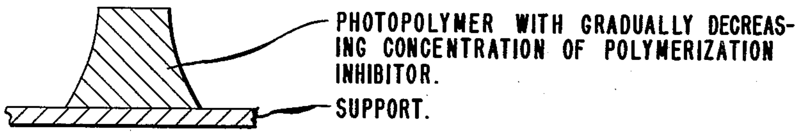
FIG. 3 is an enlarged cross-section of a printing character resulting from a photopolymerizable element having a plurality of layers of increased inhibitor concentration.

Although actinic light or radiation from any source can be used in these photopolymerization processes, it is preferred to use a broad radiation source close to the image-bearing transparency from which the relief is to be made. A broad radiation source gives uniform coverage over a large area and permits a short exposure time. By using a broad radiation source, relatively close to the image bearing transparency, the rays passing through the clear areas of the transparency enter as divergent beams and thus irradiate a continually diverging area in the photopolymerizable layer underneath the clear portions of the transparency, resulting in a polymeric relief having its greatest width at the bottom of the photopolymerized layer, i.e., a frustum, the top surface of the relief being the dimensions of the clear area. The degree of taper of the relief image below its printing surface can be controlled, within limits, by the geometry of the radiation source. With the inhibitor differential of the present invention, however, the very careful adjustment of radiation source is unnecessary. When there are two strata, the upper one containing a greater amount of inhibitor than the lower, reliefs are obtained which in three dimensions comprise two frustums, one on top of the other, with the base angles of the uppermost being much greater than the base angles of the lower frustum and with the major base of the lower frustum being of greater area than that of the upper one. Similarly, the cross-section of the reliefs thus involve two trapezoids, one superposed on the other, with the same relationship between the base angles and the bases thereof. As the number of strata of different concentration increases, the number of superposed trapezoids increases and the cross-sectional shape of the printing character approaches that shown in FIG. 3. The preferred total thickness of the photosensitive layer including all strata of increased amount of inhibitor is 5 to 60 mils.

Inasmuch as the free-radical-generating addition-polymerization initiators activatable by actinic radiation (generally containing wavelengths from about 1200 to 7000 A., preferably 3000–4500 A. for optimum results) generally exhibit their maximum sensitivity in the ultraviolet range, the radiation source should furnish an effective amount of this radiation. Such sources include carbon arcs, mercury-vapor arcs, fluorescent lamps with special ultraviolet-light-emitting phosphors, argon glow lamps, and photographic flood lamps. Of these, the mercury-vapor arcs, particularly the sun-lamp type, and the fluorescent sun-lamps, are most suitable. The sun-lamp mercury-vapor arcs are customarily used at a distance of 1.5 to 10 inches from the photopolymerizable layer.

The printing reliefs made in accordance with this invention can be used in all classes of printing but are most applicable to those classes of printing wherein a distinct difference of height between printing and non-printing areas is required. These classes include those wherein the ink is carried by the raised portion of the relief such as in dry-offset printing and ordinary letterpress printing, the latter requiring greater height differences between printing and nonprinting areas. The plates are obviously useful for multicolor printing.

An advantage of this invention is that it provides photopolymerizable elements which can be readily photopolymerized to form high-quality images of sufficient thickness to eliminate routing when the process negative contains very small and very large clear areas. It provides photopolymerizable elements which are useful for forming a single printing plate having line and very fine halftone images from a single exposure through a negative containing such images.

An important advantage of the invention is that it provides a simple and dependable means for controlling the shape of the printing character. The production of the desired character form takes place automatically and therefore eliminates tedious control of exposure by the technician.

Another advantage is that the invention provides much greater exposure latitude than has been possible heretofore.

Another advantage is that halftone screens having at least 150 lines per inch can be used and text images and halftone images from such screens may be used in the same printing plate.

Still another advantage is that there is little collection of printing ink and paper dust or debris in the relief during printing.

A further advantage is that printing plates made according to the invention exhibit long press life, because, as the printing characters wear, there is little adverse effect on the quality of the print obtained, inasmuch as the sides of the upper portions of the characters are relatively straight.

This application is a continuation-in-part of application Ser. No. 684,186, filed September 16, 1957.

I claim:

1. A photopolymerizable element comprising a support and a solid photopolymerizable layer from 5 to 250 mils in thickness comprising (1) a non-gaseous, addition polymerizable ethylenically unsaturated compound capable of forming a high polymer by photoinitiated addition polymerization in the presence of an addition polymerization initiator therefor activatable by actinic radiation, (2) a preformed compatible macromolecular polymer, (3) about 0.001% to about 35% by weight of such an initiator based on the weight of said unsaturated compound, and (4) from 30 to 150,000 parts by weight per million parts by weight of said unsaturated compound of an inhibitor of thermal addition polymerization, the upper stratum of said photopolymerizable layer being at least 2.5 mils in thickness and constituting not more than one-half of the thickness of the photopolymerizable layer and containing at least 1.5 times the amount of inhibitor in the lower stratum of said layer.

2. An element as set forth in claim 1 wherein said initiator is thermally inactive below 85° C.

3. An element as set forth in claim 1 wherein a stratum of antihalation material is disposed beneath the bottom surface of said photopolymerizable layer.

4. An element as set forth in claim 1 wherein said support is a metal and a stratum of antihalation material is disposed between the surface of the metal and the photopolymerizable layer.

5. An element as set forth in claim 1 wherein said layer contains a substantial amount of a cross-linking, non-gaseous ethylenically unsaturated addition polymerizable compound containing a plurality of terminal ethylenic groups.

6. An element as set forth in claim 1 further characterized in that a lower stratum of said layer has a concentration of initiator greater than enough to effect uniform polymerization in the layer, the concentration of the initiator in the entire layer being about 0.001% to about 35% by weight of the unsaturated compound.

7. An element as set forth in claim 1 wherein the said lower stratum constituting the major thickness of the photopolymerizable layer has a plurality of strata containing the initiator in progressively increasing concentration.

8. An element as set forth in claim 1 wherein the said lower stratum constituting the major thickness of the photopolymerizable layer has a plurality of strata containing said initiator in progressively increasing concentration and the said lower stratum constituting the upper minor thickness of the photopolymerizable layer has a plurality of strata containing the inhibitor in progressively decreasing concentration.

9. A process for making a printing relief which comprises exposing to actinic light, imagewise, a photopolymerizable element comprising a support and a solid photopolymerizable layer from 5 to 250 mils in thickness comprising (1) a non-gaseous, addition polymerizable ethylenically unsaturated compound capable of forming a high polymer by photoinitiated addition polymerization in the presence of an addition polymerization initiator therefore activatable by actinic light, (2) a preformed compatible macromolecular polymer, (3) about 0.001% to about 35% by weight of such an initiator based on the weight of said compound and (4) from 30 to 150,000 parts by weight per million parts by weight of said unsaturated compound of an inhibitor of thermal addition polymerization, the upper stratum of said photopolymerizable layer being at least 2.5 mils in thickness and constituting not more than one-half of the thickness of the photopolymerizable layer and containing at least 1.5 times the amount of inhibitor in the lower stratum of said layer, until substantial polymerization to the insoluble state occurs in the exposed areas of addition polymerization strata, with substantially no addition polymerization in the non-exposed areas, and removing unexposed and unpolymerized portions of said layer.

10. A process as defined in claim 9 wherein the imagewise exposure is through a transparency having light-opaque areas of the same optical density and light-transparent areas of the same optical density.

No references cited.